(12) United States Patent
Richmond

(10) Patent No.: US 11,712,879 B2
(45) Date of Patent: Aug. 1, 2023

(54) HEATER ELEMENT AND METHOD OF MANUFACTURE THEREOF

(71) Applicant: GKN Aerospace Services Limited, Redditch (GB)

(72) Inventor: Nolan Richmond, Redditch (GB)

(73) Assignee: GKN Aerospace Services Limited, Solihull (GB)

( * ) Notice: Subject to any disclaimer, the term of this patent is extended or adjusted under 35 U.S.C. 154(b) by 805 days.

(21) Appl. No.: 16/500,435

(22) PCT Filed: Apr. 6, 2018

(86) PCT No.: PCT/EP2018/058898
§ 371 (c)(1),
(2) Date: Oct. 3, 2019

(87) PCT Pub. No.: WO2018/185305
PCT Pub. Date: Oct. 11, 2018

(65) Prior Publication Data
US 2020/0062407 A1 Feb. 27, 2020

(30) Foreign Application Priority Data
Apr. 6, 2017 (GB) ...................................... 1705586

(51) Int. Cl.
*B22F 10/25* (2021.01)
*B22F 7/02* (2006.01)
(Continued)

(52) U.S. Cl.
CPC ................. *B32B 33/00* (2013.01); *B22F 7/02* (2013.01); *B22F 10/25* (2021.01); *B22F 12/55* (2021.01);
(Continued)

(58) Field of Classification Search
CPC ........ H05B 2203/013; H05B 2203/017; H05B 2203/033; H05B 2203/003;
(Continued)

(56) References Cited

U.S. PATENT DOCUMENTS 5,061,567 A * 10/1991 Brochot .................. C03C 17/38
428/428
5,952,040 A * 9/1999 Yadav ...................... H01G 4/12
427/126.3

(Continued)

FOREIGN PATENT DOCUMENTS

CN 101235499 A 8/2008
CN 102811907 A 12/2012
(Continued)

OTHER PUBLICATIONS

JPO Notice of Reasons for Rejection dated Mar. 1, 2022 for related Patent Application No. JP2020-504437 (English translation only; 5 pages).
(Continued)

*Primary Examiner* — Chris Q Liu
(74) *Attorney, Agent, or Firm* — Bejin Bieneman PLC

(57) ABSTRACT

In a method of manufacturing an electrothermal heater mat, a heater element is deposited on a first one of the dielectric layers of the heater mat by using a laser blown powder process.

11 Claims, 4 Drawing Sheets

(51) Int. Cl.
| | |
|---|---|
| B29C 64/153 | (2017.01) |
| B23K 26/144 | (2014.01) |
| B32B 33/00 | (2006.01) |
| B64D 15/12 | (2006.01) |
| B22F 12/55 | (2021.01) |
| B33Y 10/00 | (2015.01) |
| B32B 27/28 | (2006.01) |
| B32B 37/18 | (2006.01) |
| B22F 12/50 | (2021.01) |

(52) U.S. Cl.
CPC ............ *B23K 26/144* (2015.10); *B64D 15/12* (2013.01); *B22F 12/50* (2021.01); *B29C 64/153* (2017.08); *B32B 27/288* (2013.01); *B32B 37/182* (2013.01); *B32B 2307/204* (2013.01); *B32B 2605/18* (2013.01); *B33Y 10/00* (2014.12)

(58) Field of Classification Search
CPC ........ H05B 2203/014; H05B 2203/037; H05B 2203/002; H05B 2203/004; H05B 2203/028; H05B 3/36; H05B 3/04; H05B 3/145; H05B 3/20; H05B 3/26; H05B 3/265; H05B 3/286; H05B 3/34; H05B 2214/02; H05B 2214/04; B23K 26/342; B23K 2101/001; B23K 35/0244; B23K 35/3033; B23K 35/3046; B23K 35/3053; B23K 35/325; B23K 26/144; B23K 26/1464; B23K 26/147; B23K 26/1476; B23K 26/38; B23K 2101/40; B23K 2103/50; B23K 2103/56; B23K 26/0624; B23K 26/18; B23K 26/40; B22F 10/20; B22F 5/04; B22F 10/25; B22F 10/36; B22F 10/66; B22F 10/80; B22F 12/53; B29C 51/00; B29C 53/04; B29C 65/02; B29C 65/1406; B29C 65/1445; B29C 65/1458; B29C 65/1464; B29C 65/342; B29C 65/3428; B29C 65/3444; B29C 65/3448; B29C 65/346; B29C 66/433; B29C 66/45; B29C 66/71; B29C 66/729; B29C 66/82661; B29C 66/83413; B29C 66/91214; B29C 66/91221; B29C 66/91411; B29C 66/91421; B29C 66/91645; B29C 66/91655; B29C 70/82; B29C 70/885; B29C 2793/0081; B29C 51/02; B29C 51/12; B29C 65/14; B29C 65/3412; B29C 65/344; B29C 65/3468; B29C 65/3476; B29C 65/348; B29C 65/3488; B29C 65/3492; B29C 65/362; B29C 65/364; B29C 65/3644; B29C 65/368; B29C 66/1122; B29C 66/133; B29C 66/431; B29C 66/4312; B29C 66/432; B29C 66/4326; B29C 66/723; B29C 66/72321; B29C 66/72325; B29C 66/72326; B29C 66/7294; B29C 66/73921; B29C 66/81831; B29C 66/81871; B29C 66/91218
USPC ... 219/201, 528, 529, 544, 548, 553, 121.72
See application file for complete search history.

(56) References Cited

U.S. PATENT DOCUMENTS

| | | | | |
|---|---|---|---|---|
| 8,178,457 | B2* | 5/2012 | de Rochemont | H01Q 5/307 |
| | | | | 501/154 |
| 9,878,401 | B1* | 1/2018 | Veeramani | C25D 5/48 |
| 2008/0099617 | A1 | 5/2008 | Gilmore et al. | |
| 2008/0178994 | A1* | 7/2008 | Qi | B23P 6/007 |
| | | | | 156/245 |
| 2009/0194525 | A1 | 8/2009 | Lee et al. | |
| 2013/0001211 | A1 | 1/2013 | Lewis et al. | |
| 2014/0015172 | A1* | 1/2014 | Sidhu | C22C 49/14 |
| | | | | 264/497 |
| 2014/0197145 | A1* | 7/2014 | Veeramani | B23K 26/38 |
| | | | | 219/121.72 |
| 2016/0115081 | A1* | 4/2016 | Cho | C02F 1/325 |
| | | | | 422/119 |
| 2016/0320534 | A1* | 11/2016 | Dodson | G02B 5/0858 |

FOREIGN PATENT DOCUMENTS

| | | |
|---|---|---|
| CN | 103671339 A | 3/2014 |
| EP | 1757519 A2 | 2/2007 |
| FR | 2678468 A1 | 12/1992 |
| GB | 833675 A | 4/1960 |
| GB | 2477336 A | 8/2011 |
| GB | 2477340 A | 8/2011 |
| JP | 2008190038 A | 8/2008 |
| JP | 2016059939 A | 4/2016 |
| WO | 02/17687 A1 | 2/2002 |
| WO | 02/080619 A1 | 10/2002 |
| WO | 2016/160749 A1 | 10/2016 |

OTHER PUBLICATIONS

Yellup, J.M.: "Laser cladding using the powder blowing technique", Surface and Coatings Technology, vol. 71, No. 2, Mar. 2, 1995, pp. 121-128, XP055483289, Amsterdam, NL; ISSN: 0257-8972, DOI: 10.1016/0257-8972(94)01010-G p. 121, right column, second paragraph.
International Search Report and Written Opinion for PCT/EP2018/058898 dated Aug. 16, 2018 (18 pages).
Combined Search and Examination Report for GB1705586.14 dated Jul. 19, 2017 (8 Pages).
Su, Tao, Chen, Chen, and Tian, "Microstructural characteristics and formation mechanism of laser cladding of titanium alloys on carbon fiber reinforced thermoplastics", Material Letters, 2017, vol. 195, pp. 228-231, Elsevier.
China National Intellectual Property Administration Notification of First Office Action for Application No. CN201880030056.8 dated Mar. 17, 2021 (18 pages; with English translation).

\* cited by examiner

HEATER ELEMENT AND METHOD OF MANUFACTURE THEREOF

CROSS REFERENCE TO RELATED APPLICATIONS

This application is a national stage of, and claims priority to, Patent Cooperation Treaty Application No. PCT/EP2018/058898, filed on Apr. 6, 2018, which application claims priority to Great Britain Application No. GB1705586.4, filed on Apr. 6, 2017, which applications are hereby incorporated herein by reference in their entireties.

BACKGROUND

For an aircraft, the in-flight formation of ice on the external surface of the aircraft is undesirable. The ice destroys the smooth flow of air over the aircraft surface, increases drag and additionally decreases the ability of an aerofoil to perform its intended function.

Also, built-up ice may impede the movement of a movable control surface such as a wing slat or flap. Ice which has built up on an engine air inlet may be suddenly shed in large chunks which are ingested into the engine and cause damage.

It is therefore common for aircraft, and particularly commercial aircraft, to incorporate an ice protection system. A commercial aircraft may use a system which involves bleeding hot air off from the engines, and the hot air is then ducted to the airframe components such as the leading edges of the wing and the tail which are prone to ice formation. More recently, electrically powered systems have been proposed, such as in EP-A-1,757,519 which discloses a wing slat having a nose skin which incorporates an electrothermal heater blanket or mat. The heater mat is bonded to the rear surface of a metallic erosion shield which comprises the forwardly-facing external surface of the nose skin.

The heater mat is of the "SPRAYMAT®" type and is a laminated product comprising dielectric layers made of pre-impregnated glass fibre cloth and a heater element formed by flame spraying a metal layer onto one of the dielectric layers. The SPRAYMAT has a long history from its original development in the 1950s by D. Napier & Sons Limited (see their GB-833,675 relating to electrical de-icing or anti-icing apparatus for an aircraft) through to its subsequent use.

A SPRAYMAT produced in recent years by GKN Aerospace of East Cowes, United Kingdom, for use in a wing slat is formed on a male tool and involves laying up a stack of layers comprising (i) about 10 layers of glass fibre fabric pre-impregnated with epoxy which has been cured in an autoclave, (ii) a conductive metal layer (the heater element) which, as has been done in previous products, has been flame sprayed onto the laminate using a mask to form the heater element pattern and (iii) a final 3 or so layers of the glass fibre fabric. Wiring is soldered to the heater element to permit connection to the aircraft's power system. The heater mat is then cured in an autoclave.

A heater mat often incorporates a conductive ground plane as a safety device for detecting a fault with a heater element of the heater mat. The ground plane is connected to an aircraft earth as well as to a control unit.

A heater mat is generally very reliable. However, if the heater element in the heater mat does develop a fault in the form of heater burn-out, current will leak to the aircraft earth via the ground plane and the control unit can detect this change in current and take action to prevent thermal damage to the structure of the heater mat.

Recently a technique has been developed of applying the heater element and the ground plane as a flame sprayed metal layer (such as of copper or copper alloy) where the heater element or ground plane is sprayed (using a mask) onto a dielectric ply layer which is made of thermoplastic material instead of the previously-used thermosetting (e.g. epoxy resin) material. This newer type of arrangement for the heater element and ground plane is described in GB-A-2,477,336 to GB-A-2,477,340, the disclosures of which are incorporated herein by reference in their entireties.

When using this technique in relation to a heater element, mask(s) are used during the flame spraying to achieve the required accuracy and tolerances for the desired heater element geometry. The metal or alloy is flame sprayed onto a mask (onto a pattern of aperture(s) in the mask, and onto the areas of the mask adjacent to the aperture(s) or onto substantially all of the mask surface), and then the mask is removed to leave a heater element in the shape of the pattern on the surface of the dielectric layer.

The flame spraying process offers limited capability to produce predetermined variations in the thickness of the heater element at different positions along a track of the heater element because the mask pre-defines where the heater element is laid down. Variations of thickness (variations in height) can be desirable for the purpose of adjusting and balancing current flow along the length of the track of the heater element to avoid unwanted localised hot spots and cold spots and again, because of the pre-determined nature of flame spraying, there is no opportunity for producing a tailor-made product during the production process.

Overall, it has been found that heater element deposition using flame spraying tends to be an iterative empirical process which is sensitive to multiple variables.

The heater element may comprise a busbar (a power distribution track) and a heating track which is connected to the busbar. The busbar may comprise a copper alloy, and the heating track may comprise an aluminium and copper alloy. The alloys must be flame sprayed separately, and separate masks are required. This increases the cost and complexity of the process of manufacturing the heater mat.

Often the heater mat is manufactured in a flat (2D) configuration, and it may then be flexed or bent if a non-planar (3D) configuration is needed for installation. However, if the heater mat is to be manufactured in a non-planar (3D) configuration, the masking procedure is made more complicated and time consuming.

Instead of using a mask to produce a copper busbar, a printed circuit board (PCB) style etching process may be used, but this process adds significant cost to the overall process of manufacturing the heater mat because a third party often has to be used for PCB-style etching and most of the copper material (often about 99% of the copper material) is lost during the etching process.

It would be desirable to provide an improved heater element which allows for adaptability during the production of the heater mat.

SUMMARY

Disclosed herein is a heater element of an electrothermal heater mat and method of manufacture thereof, in particular but not exclusively an electrothermal heater mat for use in an ice protection system. The electrothermal heater mats are suitable for a range of applications where ice may form on a surface such as in an aircraft or other aerodynamic structure such as a blade of a wind turbine to prevent ice from forming and/or to remove ice that has already formed. These two functions may be termed anti-icing and de-icing, respectively.

According to a first aspect, there is provided a method of manufacturing an electrothermal heater mat as set out in claim 1. The method typically, comprises the steps of: providing a plurality of dielectric layers; depositing a heater element on a first one of the dielectric layers by using a laser blown powder process; forming a stack comprising the dielectric layers and the heater element; and laminating together the dielectric layers of the stack.

Compared with the previous technique of flame spraying a heater element, the technique of depositing the heater element using a laser blown powder (LBP) process (which is a form of additive manufacturing (AM)) enhances the accuracy of the laying down of the heater element.

In preferred embodiments, no mask is used when the heater element is deposited.

By not using a mask, the manufacturing process is simplified and speeded up, because there is no delay caused by having to make a mask needed for a particular (new) pattern of heater element. When making a series of heater mats with different heater element patterns, a laser blown powder deposition machine may easily cope with the changes in heater element location and configuration associated with the different heater element patterns because no masks have to be positioned and then removed for the deposition of the different heater elements.

When a series of different heater element patterns is needed on successive heater mats, the machine may be programmed simply to switch in succession from depositing a first heater element to depositing a second, different heater element as the next heater element.

The laser blown powder process is an additive process rather than a subtractive process and thus, compared with etching for copper busbar production, the amount of waste copper is greatly reduced.

In some embodiments, said first dielectric layer comprises thermoplastic material.

In some embodiments, each of the dielectric layers comprises thermoplastic material.

For example, the thermoplastic material may comprise PEEK (polyether ether ketone), PEKK (polyetherketoneketone), PPS (polyphenylene sulphide), PEI (polyetherimide) or PES (polyethersulphone) or a mixture thereof. Alternatively, the thermoplastic material comprises PEEK, PEKK or a mixture thereof. It is also possible that the material can be a nano-ceramic dielectric, for example a nano-ceramic dielectric cloth.

In some embodiments, the heater element comprises a heating track and a busbar; and, during the step of depositing the heater element, a first metal powder is used to deposit the heating track and a second, different metal powder is used to deposit the busbar.

For example, the second metal powder may be a copper powder. Such a powder is commercially available for use in a laser blown powder process.

The first powder may be an aluminium and copper alloy. Such a powder may be produced by atomising an existing wire made of the alloy.

It is also possible that during manufacture two or more materials may be laid down during the production process so the material forming the heater element can be modified as it is being laid down. The process involves feeding material from hoppers which are then either mixed to form a defined mixture that forms the heater element, or the materials can be laid down sequentially so layers of material as required form the heater element.

In some embodiments, a deposition tool is connected to a supply of a first metal powder and a supply of a second metal powder and is configured to transition between using the supply of the first metal powder and using the supply of the second metal powder when switching between depositing a first track component (e.g. a heating track) and depositing a second track component (e.g. a busbar), or vice versa. In this way, the composition of the deposited metal may be modified during the deposition process.

In some embodiments, the transition occurs gradually such that there is deposited, during the transition, a mixture of the first and second powders.

In some embodiments, the heater element has a first length of a first thickness and second length of a second thickness; and during the step of depositing the heater element, a deposition tool is arranged to deposit a greater thickness of powder at the first length than at the second length.

Thus, the thickness (the height) of deposition may be tailored to heater element geometry during the design process in order to balance current flow around the heater element features. Unwanted hot and cold spots may therefore be avoided.

In some embodiments, a variation in thickness of the heater element (or a heater element component, such as a heating track) a different points along its length may be from a minimum thickness T1 to a maximum thickness T2, where T2 is 3×T1, or 2×T1, or 1.5×T1, or 1.2×T1.

In some embodiments, during the step of depositing the heater element, the first dielectric layer is a non-planar layer and a deposition tool follows a deposition path which is non-planar. Thus, the present method may be used to manufacture 3D heater element geometries.

According to a second aspect, there is provided manufacturing apparatus comprising: a laser blown powder deposition machine having a deposition tool defining a deposition location at the intersection of a laser axis and a powder feed axis; and a dielectric layer having a surface positioned at the deposition location.

Features of the first aspect may be applied mutatis mutandis to the second aspect, and vice versa.

BRIEF DESCRIPTION OF THE DRAWINGS

Example embodiments will now be described, by way of example only, with reference to the accompanying drawings in which:—

Figure 1:
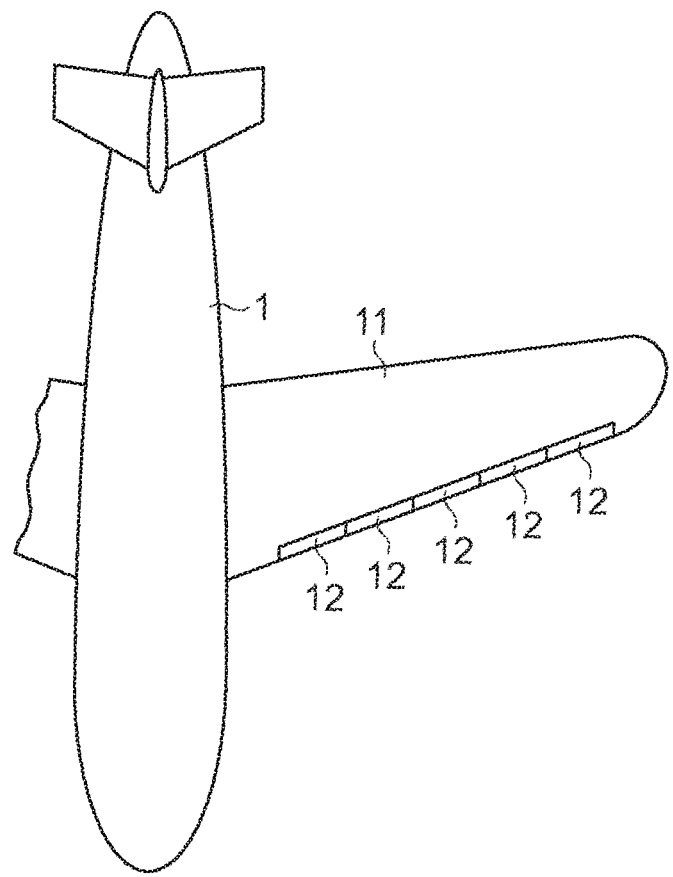
FIG. 1 is a diagrammatic plan view of an aircraft having slats in the leading edge of a wing.

While the invention is susceptible to various modifications and alternative forms, some embodiments are shown by way of example in the drawings and are herein described in detail. It should be understood, however, that the drawings and detailed description of these embodiments are not intended to limit the invention to the particular forms disclosed. In addition although individual embodiments may have been discussed, the invention is intended to cover combinations of those embodiments. The invention covers all modifications, equivalents and alternatives falling within the spirit and the scope of the present invention as defined by the appended claims.

DESCRIPTION OF SOME EMBODIMENTS

FIG. 1 is a plan view of an aircraft 1 having a wing 11 along the leading (forward) edge of which are positioned five wing slats 12. Each wing slat 12 incorporates an electrothermal ice protection system.

Figure 2:
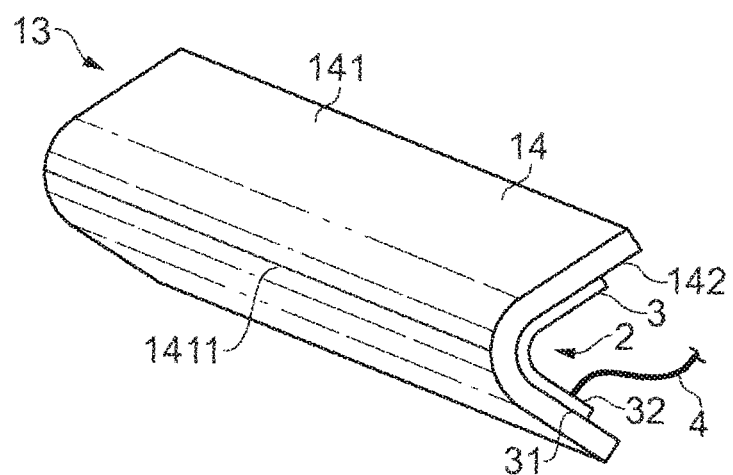
FIG. 2 is a diagrammatic perspective view of a nose skin of a wing slat of FIG. 1.

FIG. 2 is a diagrammatic perspective view of a demountable nose skin 13 of one of the wing slats 12 of FIG. 1. The configuration of the nose skin 13 may be generally the same as in EP-A-1,757,519 (GKN Aerospace) which discloses a wing slat having a demountable forward section comprising a nose skin.

The nose skin 13 comprises an erosion shield 14 and an electrically-powered heater 2.

The heater 2 comprises a heater blanket or mat 3 and a bundle of wires or lines 4 which connect the heater mat 3 to associated power supply and control electronics.

The erosion shield 14 is generally rectangular and has a front surface 141 which is convexly curved and a rear surface 142 which is concavely curved. An apex 1411 of the front surface 141 provides the leading edge of the aircraft wing 11.

The heater mat 3 is generally rectangular and has a front surface 31 which is convexly curved and a rear surface 32 which is concavely curved. The convex front surface 31 conforms to the shape of and is bonded to the rear surface 142 of the erosion shield 14. In this way, thermal energy generated as the heater mat 3 is operated passes, by conduction, into the erosion shield 14 in order to provide an ice protection function. The erosion shield 14 is metallic and may be made of aluminium or titanium. A function of the erosion shield 14 is to protect the aircraft against lightning strikes by absorbing and dissipating the lightning current.

The concave rear surface 32 of the heater mat 3 may be attached to a support structure of the wing slat 12.

Figure 3:
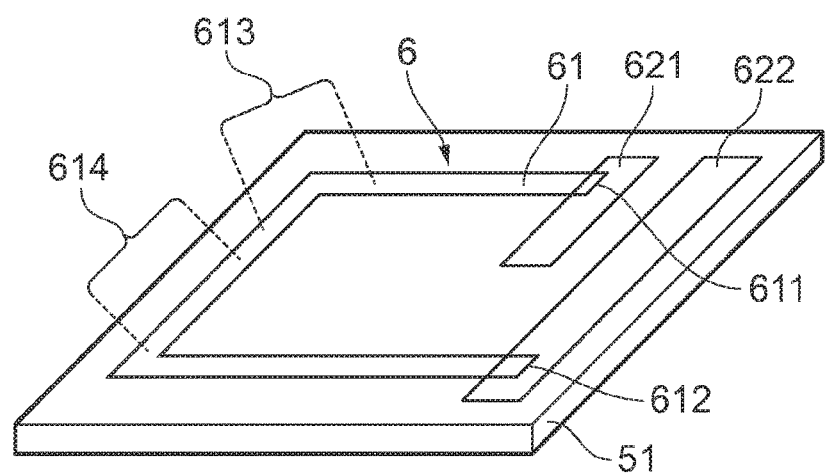
FIGS. 3 to 5 are a diagrammatic representation of the stages of an embodiment of the manufacturing method.

FIG. 3 is a diagrammatic representation of a dielectric layer 51 of a heater mat 3 at a first stage of an embodiment of manufacturing method.

The dielectric layer 51 is made of thermoplastic material, and a metallic heater element 6 is formed thereon. The heater element 6 comprises a heating track 61 and a first busbar 621 at a first end 611 of the heating track 61, and a second busbar 622 at a second end 612 of the heating track 61. The busbars 621, 622 may be connected to the wires 4.

Figure 4:
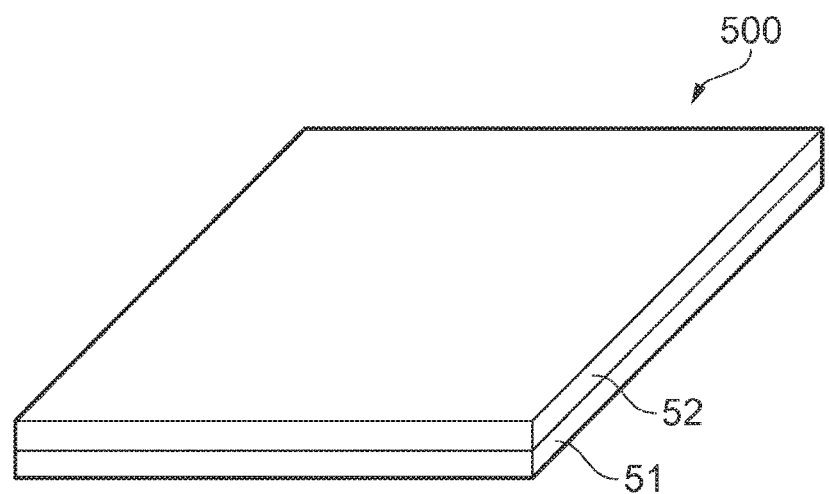

A next stage is diagrammatically shown in FIG. 4. A second dielectric layer 52 is placed on top of the first dielectric layer 51 to form a stack 500. The material of the second layer 52 is compatible with or the same as the dielectric material of the first layer 51. For example, PEEK, PEKK, PPS, PEI or PES or a mixture thereof may be used.

Further dielectric layers may be added to the stack 500. Components such as ground planes and temperature sensors may be included in the stack 500. Reinforcement material may also be included if desired.

Figure 5:
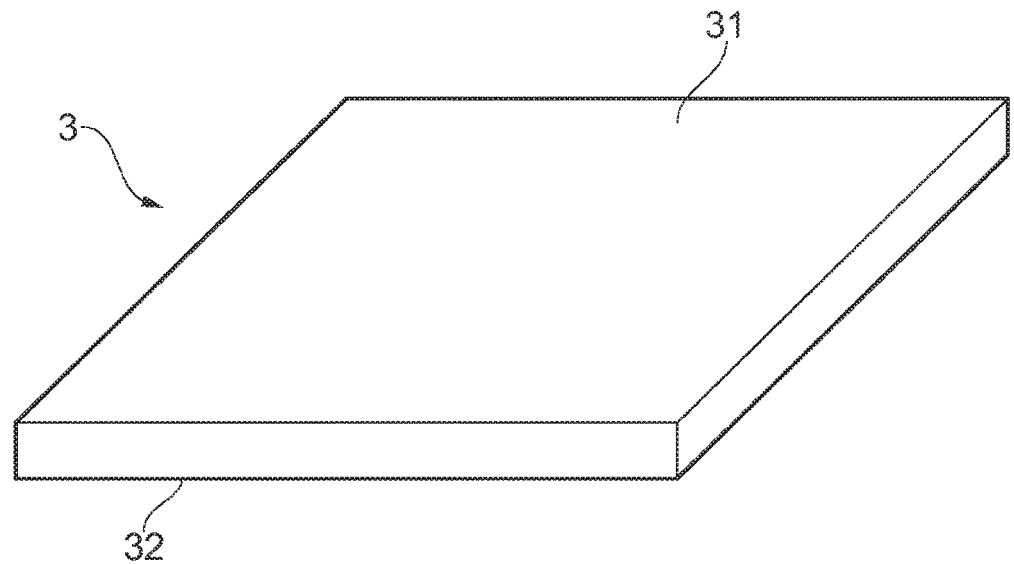

A next stage of the process is diagrammatically shown in FIG. 5. When the stack 500 is in its final form, heat and pressure are applied to the stack of components so as to consolidate the laminate into a monolithic structure in the form of the heater mat 3 shown in FIG. 5. Lamination may be performed using a conventional autoclave, heated press or large laminating machine. Such machinery can be used to heat the stack of components to above the melt point of the thermoplastic material whilst applying pressure, in order to consolidate the laminate.

Figure 6:
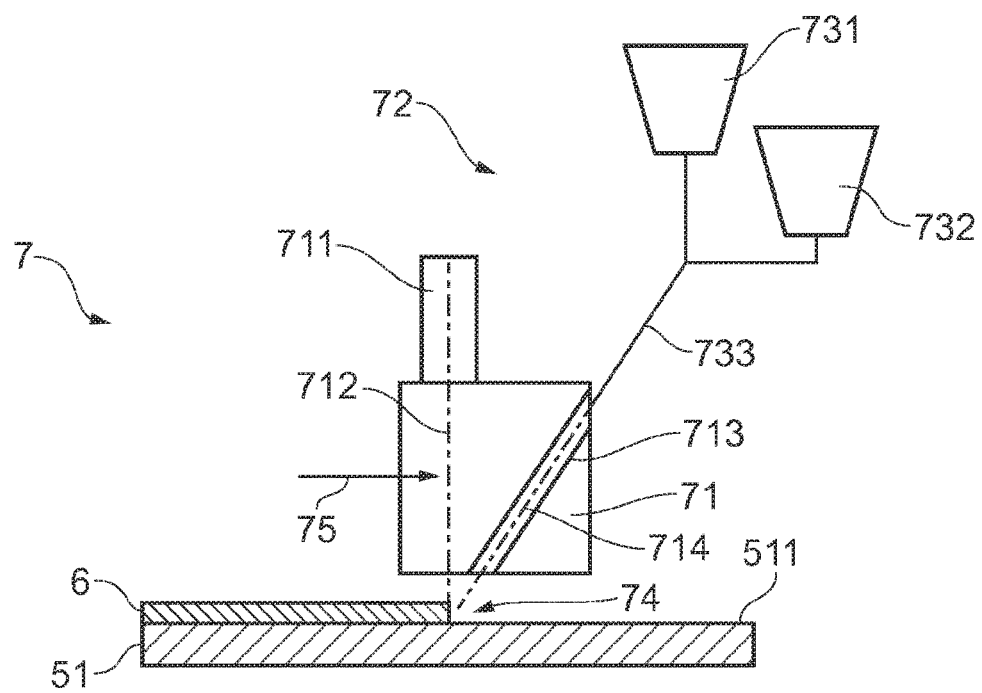
FIG. 6 is a diagrammatic representation of apparatus for laying down the heater element shown in FIG. 3.

FIG. 6 is a diagrammatic representation of apparatus 7 for laying down the heater element 6 shown in FIG. 3. As shown in FIG. 6, a substrate in the form of the dielectric layer 51 is positioned adjacent to a deposition tool 71 of a laser blown powder deposition machine 72. The tool 71 includes a laser source 711 which is arranged to project a laser beam along a laser axis 712. A first powder supply source 731 and a second powder supply source 732 feed a supply line 733 which leads to a powder duct 713 of the deposition tool 71 so that powder is supplied along a powder feed axis 714.

The laser axis 712 and the powder feed axis 714 intersect at a deposition location 74 at which the laser beam melts the powder and lays down a metallic layer (in the form of the heater element 6) on a surface 511 of the first dielectric layer 51.

When the heating track 61 of the heater element 6 is being laid down, an aluminium and copper alloy powder from the first powder supply source 731 may be used.

When the first busbar 621 or the second busbar 622 of the heater element 6 is being laid down, a copper powder from the second powder supply source 732 may be used.

As the deposition tool 71 lays down the different components (heating track and busbar) it may switch between the first and second powder supply sources 731, 732 so that the appropriate powder is used, so that the metal being laid down is the appropriate metal for the component that is currently being deposited. The switching (the transition between powder supply sources) may be done gradually so that a transition portion of the heater element 6 between the components (heating track and busbars) is formed from a mixture of the first and second powders. Such a transition portion may be at the first and second ends 611, 612 of the heating track 61.

The heating track 61 may have first length 613 where the metal powder is laid down to a first thickness (depth or height) and a second length 614 where the metal powder is laid down to a second, different thickness (depth or height). In the design phase, it may be calculated what thickness is required at a particular location to avoid unwanted hot or cold spots when the heater element 6 is operating. The calculated thicknesses may then be implemented by controlling the deposition operation of the deposition tool 71. For example, where a locally increased thickness is desired, the tool 71 may be made to move temporarily more slowly in the deposition direction 75, and/or the flow rate of the powder (from the supply sources 731 and/or 732) may be temporarily increased. In this way, the resistivity of the heating track 61 at a particular location may be tailored to suit that location.

Figure 7:
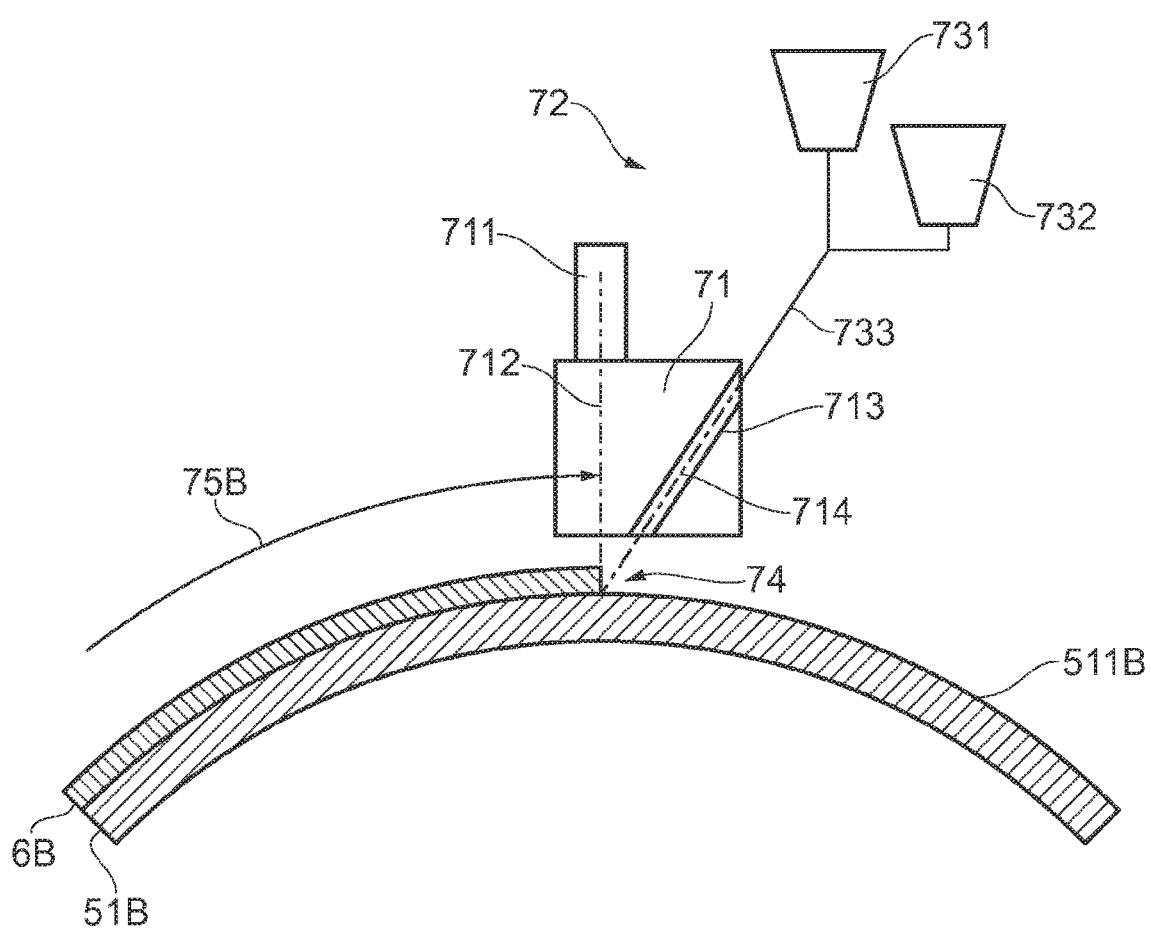
FIG. 7 diagrammatically depicts a variant of FIG. 6 wherein the heater element is laid down in three dimensions.

FIG. 7 diagrammatically depicts a variant of FIG. 6 wherein the heater element 6 is laid down in three dimensions (3D) by virtue of the first dielectric layer 51B being non-planar and by virtue of the deposition tool 71 following a non-planar deposition path 75B over the curved (e.g. convex) deposition surface 511B of the dielectric layer 51B.

The invention claimed is:

1. A method of manufacturing an electrothermal heater mat, comprising:
   providing a first dielectric layer;
   depositing a heater element on the first dielectric layer by using a laser blown powder process, wherein the heater element has a first length of a first thickness and second length of a second thickness, and during depositing the heater element, a deposition tool is arranged to deposit a greater thickness of powder at the first length than at the second length;

forming a stack comprising the first dielectric layer, the heater element, and one or more further dielectric layers; and laminating the first dielectric layer together with the one or more further dielectric layers of the stack.

2. The method of claim 1, wherein said first dielectric layer comprises a thermoplastic material.

3. The method of claim 2, wherein each of the dielectric layers comprises the thermoplastic material.

4. The method of claim 2, wherein the thermoplastic material comprises one or more of PEEK (polyether ether ketone), PEKK (polyetherketoneketone), PPS (polyphenylene sulphide), PEI (polyetherimide), or PES (polyethersulphone).

5. The method of claim 2, wherein the thermoplastic material comprises one or both of PEEK (polyether ether ketone) or PEKK (polyetherketoneketone).

6. The method of claim 2, wherein the thermoplastic material comprises nano-ceramic cloth.

7. The method of claim 1, wherein:
the heater element comprises a heating track and a busbar; and
during depositing the heater element, a first metal powder is used to deposit the heating track, and a second, different metal powder is used to deposit the busbar.

8. The method of claim 7, wherein a deposition tool is connected to a supply of the first metal powder and a supply of the second metal powder, and is configured to transition between using the supply of the first metal powder and using the supply of the second metal powder when switching between depositing the heating track and depositing the busbar, or vice versa.

9. The method of claim 8, wherein the transition occurs such that there is deposited, during the transition, a mixture of the first and second powders.

10. The method of claim 1, wherein:
during depositing the heater element, the first dielectric layer is a non-planar layer and a deposition tool follows a deposition path which is non-planar.

11. The method of claim 1, wherein the first thickness and the second thickness are heights measured outward from a surface of the first dielectric layer.

\* \* \* \* \*